(12) United States Patent
Xiao et al.

(10) Patent No.: US 8,300,952 B2
(45) Date of Patent: Oct. 30, 2012

(54) ELECTRONIC DOCUMENT COMPARISON SYSTEM AND METHOD

(75) Inventors: Wei-Qing Xiao, Shenzhen (CN); Chien-Fa Yeh, Taipei Hsien (TW); Chung-I Lee, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 384 days.

(21) Appl. No.: 12/752,150

(22) Filed: Apr. 1, 2010

(65) Prior Publication Data

US 2011/0064304 A1   Mar. 17, 2011

(30) Foreign Application Priority Data

Sep. 16, 2009   (CN) .......................... 2009 1 0307100

(51) Int. Cl.
 *G06K 9/68* (2006.01)
 *G06K 9/54* (2006.01)
 *G06K 9/60* (2006.01)
 *G06K 15/00* (2006.01)

(52) U.S. Cl. ....... 382/218; 382/305; 358/1.18; 358/403; 715/200

(58) Field of Classification Search .................. 382/100, 382/112, 175–180, 209, 217–221, 305; 358/1.16–1.18, 1.9, 403; 715/200
See application file for complete search history.

(56) References Cited

U.S. PATENT DOCUMENTS

| | | | | |
|---|---|---|---|---|
| 4,949,392 | A  * | 8/1990 | Barski et al. | 382/283 |
| 6,003,043 | A  * | 12/1999 | Hatakeyama et al. | 1/1 |
| 6,411,731 | B1 * | 6/2002 | Saito | 382/173 |
| 7,272,269 | B2 * | 9/2007 | Tojo et al. | 382/305 |
| 7,424,672 | B2 * | 9/2008 | Simske et al. | 715/243 |
| 7,519,607 | B2 * | 4/2009 | Anderson, IV | 1/1 |
| 8,196,030 | B1 * | 6/2012 | Wang et al. | 715/200 |
| 2004/0102958 | A1* | 5/2004 | Anderson, IV | 704/4 |
| 2004/0218838 | A1* | 11/2004 | Tojo et al. | 382/305 |
| 2004/0234169 | A1* | 11/2004 | Tojo | 382/305 |
| 2006/0251326 | A1* | 11/2006 | Yeh et al. | 382/176 |
| 2007/0168382 | A1* | 7/2007 | Tillberg et al. | 707/102 |
| 2009/0172513 | A1* | 7/2009 | Anderson et al. | 715/210 |
| 2009/0214116 | A1* | 8/2009 | Hirohata | 382/182 |
| 2011/0276874 | A1* | 11/2011 | Dejean | 715/243 |
| 2012/0072859 | A1* | 3/2012 | Wang et al. | 715/764 |

* cited by examiner

*Primary Examiner* — Aaron W Carter
(74) *Attorney, Agent, or Firm* — Altis Law Group, Inc.

(57) ABSTRACT

An electronic document comparison system and method removes cachets and noise from a test electronic document. The system and method further compares each of second minimum blocks with a corresponding first minimum block in a standard electronic document line by line, and obtains the second minimum blocks having different coordinates on each line. Furthermore, the system and method simplifies the obtained second minimum blocks having different coordinates by filtering designated objects, and marks the simplified second minimum blocks in the test electronic document.

19 Claims, 6 Drawing Sheets

ELECTRONIC DOCUMENT COMPARISON SYSTEM AND METHOD

BACKGROUND

1. Technical Field

Embodiments of the present disclosure relate to electronic document management, and particularly to an electronic document comparison system and method.

2. Description of Related Art

Generally, if people want to find differences between two files, they have to compare the two files manually. The manual comparison can be very time consuming, especially when people are merely focusing on specific objects of the two files.

What is needed, therefore, is an improved system and method for comparing electronic documents.

DETAILED DESCRIPTION

All of the processes described below may be embodied in, and fully automated via, function modules executed by one or more general purpose processors of a computer. Some or all of the methods may alternatively be embodied in specialized hardware. The function modules may be stored in any type of computer-readable medium or other computer storage device.

Figure 1:
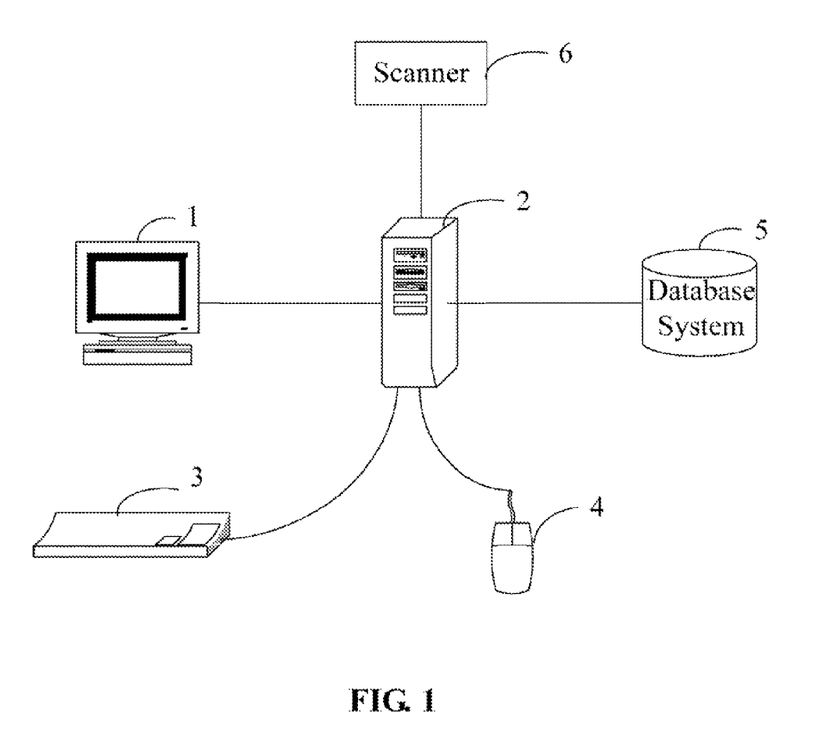
FIG. 1 is a block diagram of one embodiment of an electronic document comparison system.

FIG. 1 is a block diagram of one embodiment of a computer 2 in communication with a database system 5. The computer 2 comprises a plurality of peripherals that electronically connected to the computer 2, such as a display device 1, a keyboard 3, and a mouse 4. The peripherals may be used to input or output various computer signals or interfaces.

The computer 2 is further electronically connected to a scanner 6. In one embodiment, the computer 2 may be a personal computer (PC), a network server, or any other appropriate data-processing equipment. The scanner 6 may scan a paper document to generate an electronic document. In one embodiment, the scanner 6 may be a color scanner. In an exemplary embodiment, the electronic document may be, but not limited to, an electronic contract or an electronic order.

Figure 2:
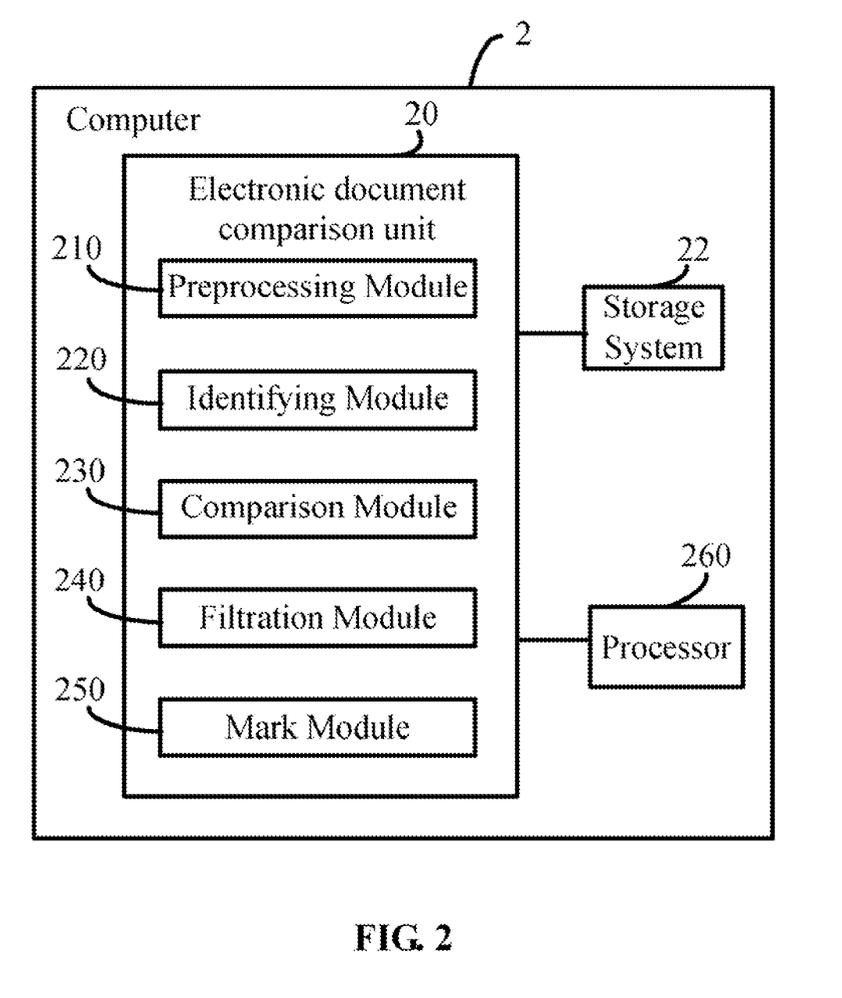
FIG. 2 is a block diagram of one embodiment of a computer of FIG. 1.

FIG. 2 is a block diagram of one embodiment of the computer 2 comprising an electronic document comparison unit 20. The electronic document comparison unit 20 may be used to compare two or more electronic documents automatically. In one embodiment, the electronic document comparison unit 20 includes a preprocessing module 210, an identifying module 220, a comparison module 230, a filtration module 240, and a mark module 250. One or more computerized codes of the modules 210-250 are stored in a storage system 22 of the computer 2. One or more general purpose or specialized processors, such as a processor 260 executes the computerized codes of the modules 210-250 to provide one or more operations of the electronic document comparison unit 20.

Figure 6:
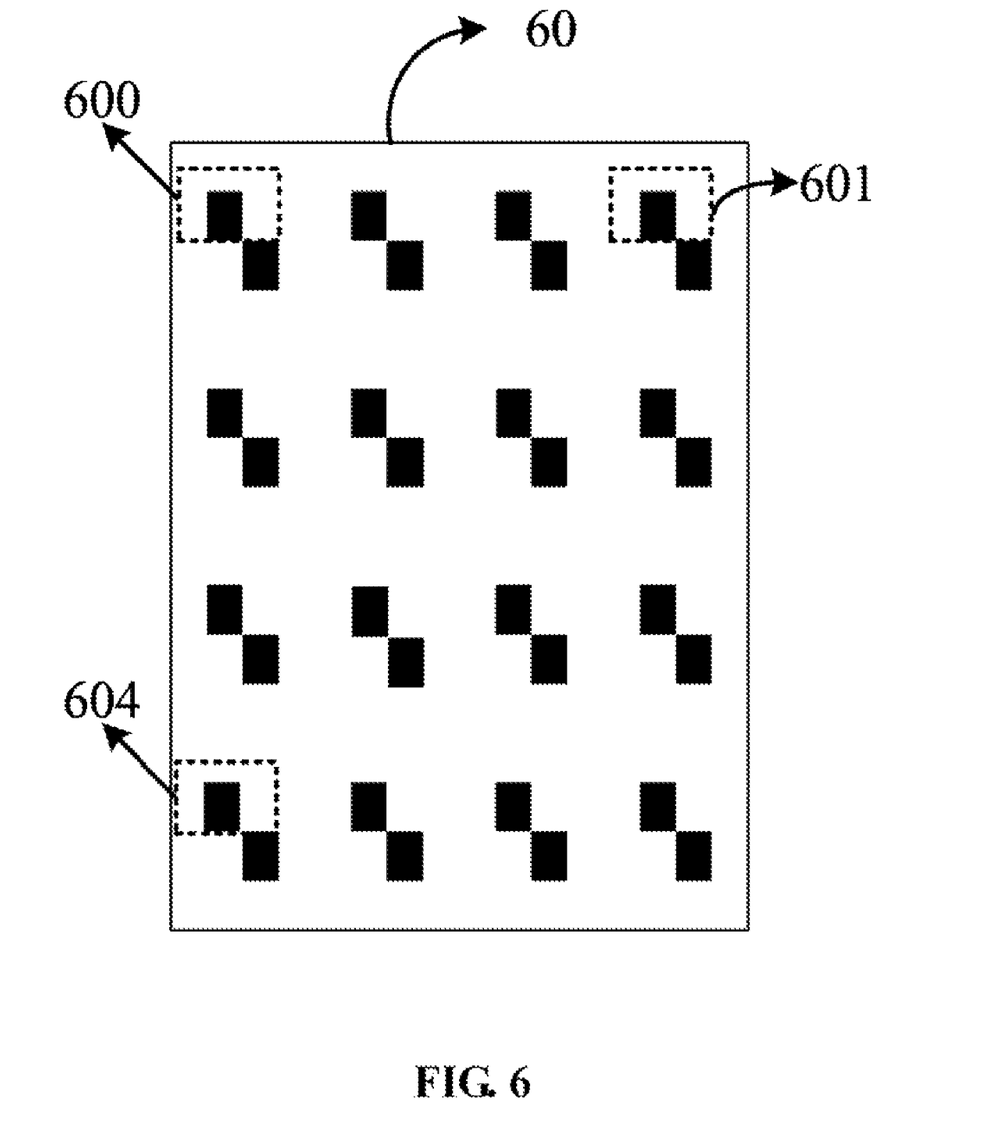
FIG. 6 illustrates one embodiment of a standard electronic document.

In one embodiment, a standard electronic document 60 is generated by the scanner 6 and stored into the database system 5, as shown in FIG. 6. The standard electronic document 60 may be compared with a test electronic document to find differences between the test electronic document and the standard electronic document 60. The standard electronic document 60 is identified using an optical character recognition (OCR) software application, and is made of a plurality of minimum blocks (hereafter "first minimum block"), such as, the first minimum blocks 600, 601 and 604. Each first minimum block may represent, but not limited to, a Chinese character, an English word, punctuation mark, or other character(s). For example, the first minimum block 600 may represent an English word "This," the first minimum block 601 may represent a Chinese character "中,"the first minimum block 604 may represent an English word "Contract." In one embodiment, the standard electronic document 60 consists of thirty two first minimum blocks.

The preprocessing module 210 preprocesses a test electronic document by removing cachets (e.g. company name, logo, firm slogan) and noise from the test electronic document. The test electronic document may also include noise (e.g., blemishes, smudges) generated from the scanner 6 scanning a paper document to generate the test electronic document. For example, as shown in FIG. 5, the test electronic document 50 may comprise a plurality of noise, such as noise 502 and 503. The preprocessing module 210 removes cachets and noise (e.g., noise 502 and 503) from the test electronic document 50. Further details of how to preprocess the test electronic document are described with respect to FIG. 4.

The identifying module 220 indentifies the test electronic document using an optical character recognition (OCR) software application, generates a plurality of second minimum blocks, and obtains coordinates of each second minimum block. In one embodiment, as shown in FIG. 5, the test electronic document 50 comprises a plurality of minimum blocks (hereafter "second minimum block"), such as, the second minimum blocks 500, 501, or 504. In one embodiment, a second minimum block may be, but not limited to, a Chinese character, an English word, punctuation mark, or other character(s). For example, the second minimum block 500 may represent an English word "This." The coordinates of each second minimum block comprises distances to page margins of the test electronic document 50. In one embodiment, the coordinates of each second minimum block comprises a distance to left page margin of the test electronic document and a distance to top page margin of the test electronic document. For example, the coordinates of the first minimum block 500 is (1.6, 2.0) and the unit of the coordinates is in centimeters (cm). That is, the distance of the minimum block 500 to the left page margin of the test electronic document 50 is 1.6 cm, and the distance of the minimum block 500 to the top page margin of the test electronic document 50 is 2.1 cm. In one embodiment, the test electronic document 50 consists of thirty two second minimum blocks.

The comparison module 230 compares each second minimum block with the corresponding first minimum block in the standard electronic document 60 line by line, and obtains the second minimum blocks having different coordinates on each line.

In one embodiment, the comparison module 230 computes a relative position of each second minimum block according to the coordinates of each second minimum block. The relative position of each second minimum block comprises two percentage values. A first percentage value is a ratio between the distance of the second minimum block to the left page margin and the width of the test electronic document, and a second percentage value is a ratio between the distance of the second minimum block to the top page margin and the length of the test electronic document. The comparison module 230 compares the relative position of each second minimum block with the relative position of the corresponding first minimum block, and determines if a deviation between the second minimum block and the corresponding first minimum block falls in an allowable range. The comparison module 230 obtains the second minimum block if the deviation between the second minimum block and the corresponding first minimum block does not fall in the allowable range. Then the comparison module 230 compares each second minimum block with the corresponding first minimum block line by line to obtain all of the second minimum blocks having different coordinates on each line.

The filtration module 240 simplifies the obtained second minimum blocks having different coordinates by filtering designated objects. In one embodiment, the designated objects may comprise, but are not limited to, fault-tolerant characters, punctuation, and similar characters. The filtration module 240 filters the designated objects using a fault-tolerant method, punctuation mark filtration method, or a character filtration method.

The mark module 250 marks the simplified second minimum blocks in the test electronic document. In one embodiment, if the second minimum block 504 is different from the first minimum block 604, the mark module 250 highlights the second minimum block 504 in a specific color, such as red, or underlines the second minimum block 504. The mark module 250 may also output a report to show position information of the second minimum block 504, thereby users may find the differences easily and quickly.

Figure 3:
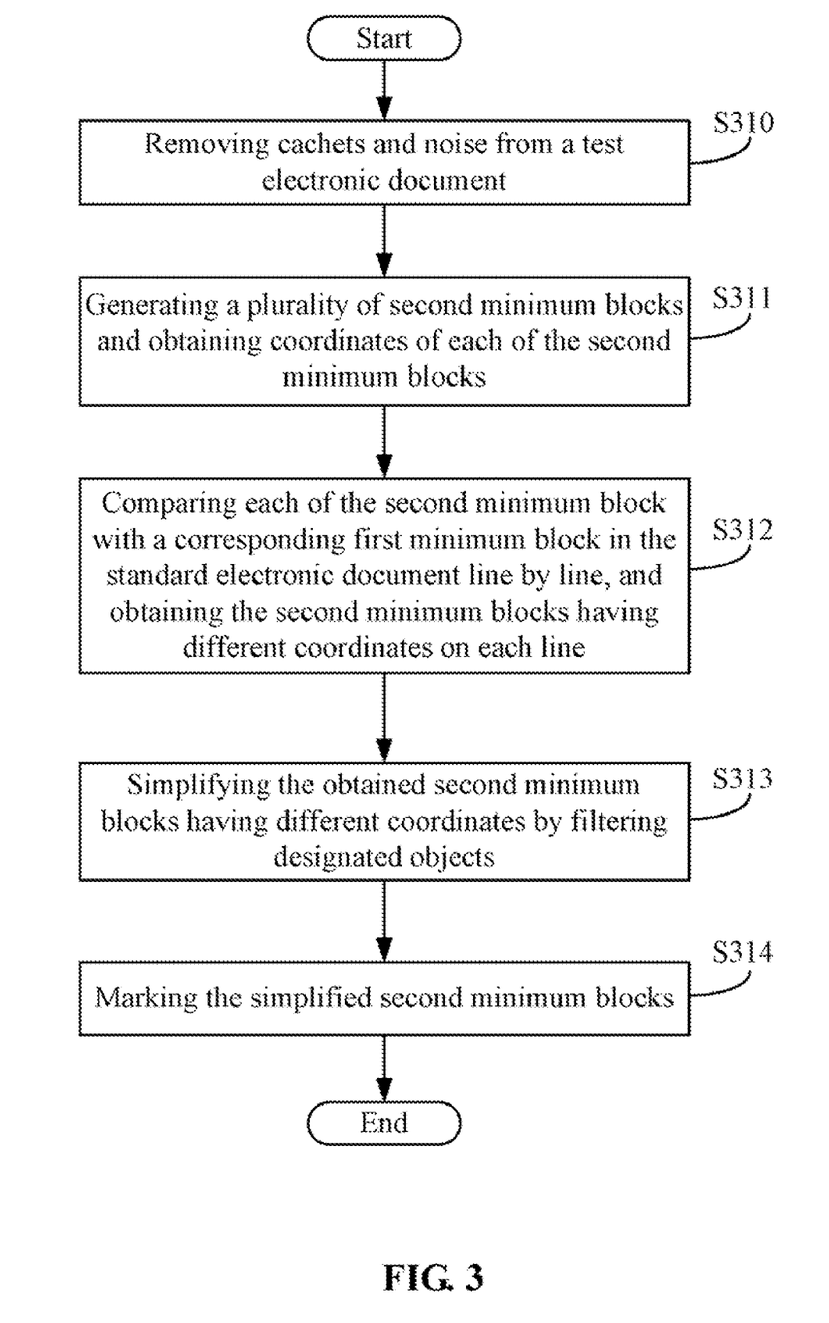
FIG. 3 is a flowchart of one embodiment of an electronic document comparison method.

FIG. 3 is a flowchart of one embodiment of an electronic document comparison method. Depending on the embodiment, additional blocks may be added, others deleted, and the ordering of the blocks may be changed.

In block S310, the preprocessing module 210 preprocesses the test electronic document by removing cachets and noise from the test electronic document. Further details of how to preprocess the test electronic document are described with respect to FIG. 4.

In block S320, the identifying module 220 identifies the test electronic document using the optical character recognition (OCR) software application, and generates a plurality of second minimum blocks and obtains coordinates of each second minimum block. The coordinates of each second minimum block comprises distances to page margins of the test electronic document 50. In one embodiment, the coordinates of each second minimum block comprises a distance to left page margin of the test electronic document and a distance to top page margin of the test electronic document. For example, the coordinates of the first minimum block 500 is (1.6, 2.0) and the unit of the coordinates is in centimeters (cm). That is, the distance of the minimum block 500 to the left page margin of the test electronic document 50 is 1.6 cm, and the distance of the minimum block 500 to the top page margin of the test electronic document 50 is 2.1 cm.

The comparison module 230 compares each second minimum block with the corresponding first minimum block in the standard electronic document 60 line by line, and determines the second minimum blocks having different coordinates with the first minimum blocks on each line.

In block S330, the comparison module 230 compares each second minimum block with the corresponding first minimum block in the standard electronic document 60 line by line, and obtains the second minimum blocks having different coordinates on each line.

In one embodiment, the comparison module 230 computes a relative position of each second minimum block according to the coordinates of each second minimum block. Taking the second minimum block 500 for example, if the width of the test electronic document 50 is 16 cm, the length of the test electronic document 50 is 40 cm, then the relative position of the second minimum block is (10%, 5%). The comparison module 230 compares the relative position of each second minimum block with the relative position of the corresponding first minimum block, and determines if a deviation between the second minimum block and the corresponding first minimum block falls in an allowable range. For example, if the relative position of the second minimum block 500 is (10%, 5%), the relative position of the first minimum block 600 is (9.9%, 4.9%), then the deviation is (1%, 2%). The comparison module 230 obtains the second minimum block if the deviation between the second minimum block and the corresponding first minimum block does not fall in the allowable range. For example, if the allowable range is [0~0.99%], then the deviation between the second minimum block 500 and the first minimum block 600 does not fall in the allowable range. Then the comparison module 230 compares each second minimum block with the corresponding first minimum block line by line to obtain all of the second minimum blocks having different coordinates on each line. For example, the comparison module 230 obtains the second minimum block 500 in the second line and the second minimum block 504 in the seventh line.

In block S340, the filtration module 240 simplifies the obtained second minimum blocks having different coordinates by filtering designated objects. As mentioned above, the designated objects comprise fault-tolerant characters, punctuation, and similar characters, the filtration module filters the designated objects using a fault-tolerant method, punctuation mark filtration method, or a character filtration method. In one embodiment, as shown in FIG. 5, the OCR software application identifies an English letter "i" as number "1," the filtration module 240 filters the designated objects by the fault-tolerant method. For example, if the second minimum block 500 is different from the first minimum block 600 because of the English letter "i," then the filtration module 240 removes the second minimum block 500 from the obtained second minimum blocks. In one embodiment, if the second minimum block 501 represents a semicolon, then the filtration module 240 filters the semicolon by the punctuation filtration method. For example, the filtration module 240 removes the second minimum block 501 from the obtained second minimum blocks. In another embodiment, if the second minimum block 501 represents a Chinese character, then the filtration module 240 filters the Chinese character by the character filtration method. For example, if the second minimum block 501 represents a Chinese character "中," the filtration module 240 compares the "中" of the second minimum block 501 with the standard Chinese character "中" of the first minimum block 601, to obtain a similarity degree. If the similarity degree falls in an allowable range, then the filtration module 240 removes the second minimum block 501 from the obtained second minimum blocks.

In block S314, the mark module 250 marks the simplified second minimum blocks in the test electronic document. In one embodiment, if the second minimum block 504 is different from the first minimum block 604, then the mark module 250 highlights the second minimum block 504 in a specific color, such as red, or underlines the second minimum block

504. The mark module 250 may also output a report to show position information of the second minimum block 504 thereby users may find the differences easily and quickly. Additionally, the report can be printed by a printer or displayed on the display device 1.

Figure 4:
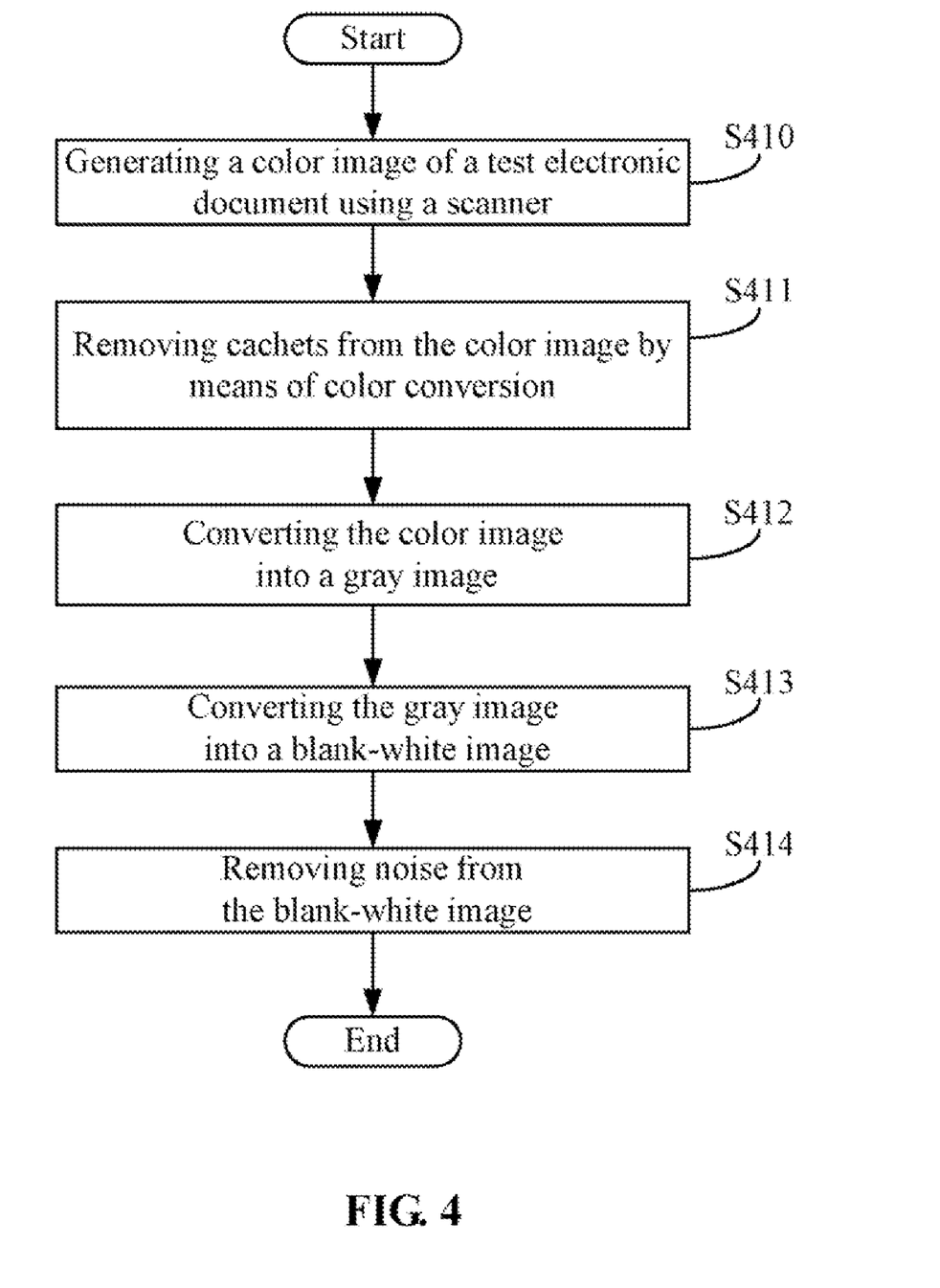
FIG. 4 is a detailed description of one block 5310 in FIG. 3 of one embodiment for preprocessing to a test electronic document.
Figure 5:
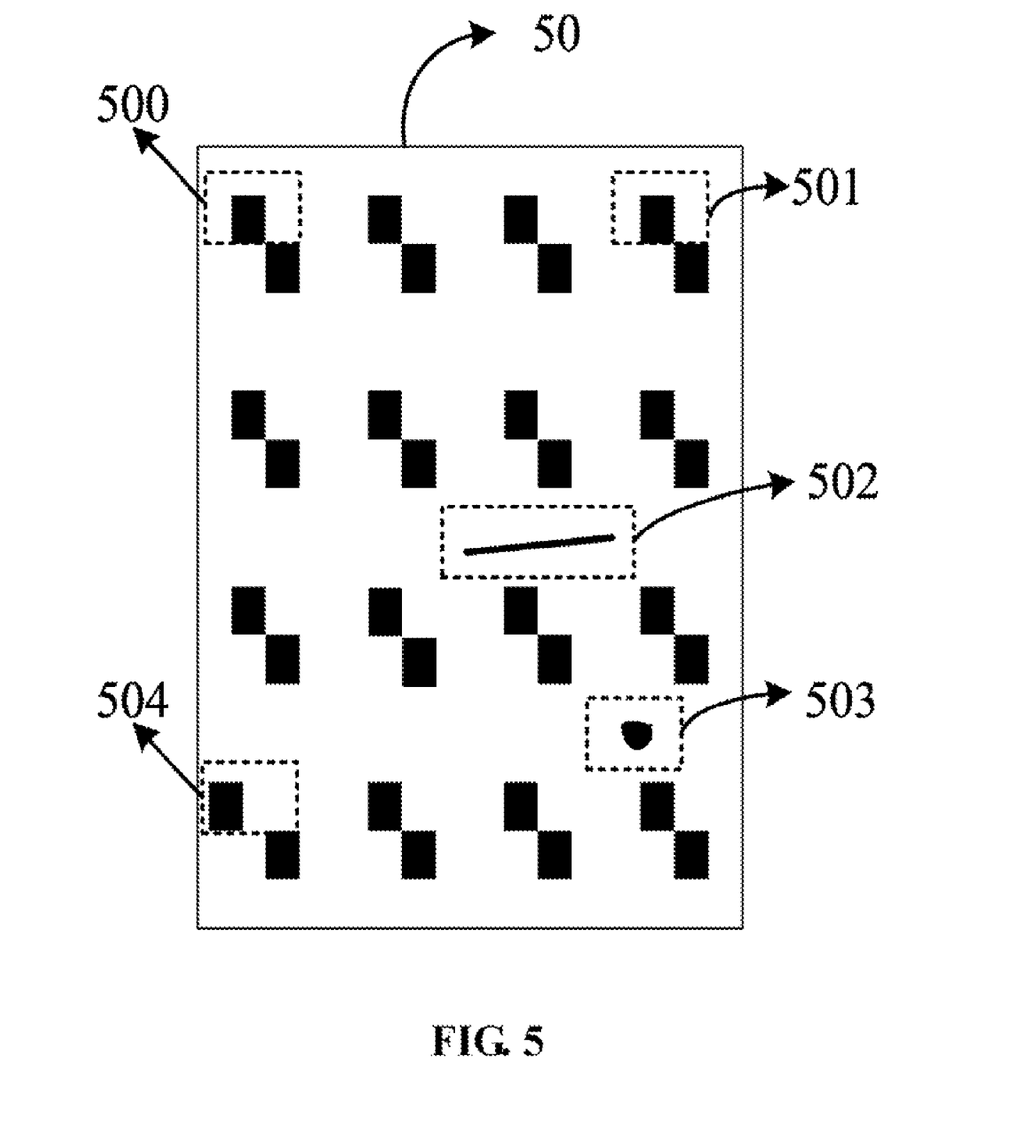
FIG. 5 illustrates one embodiment of the test electronic document.

FIG. 4 is a detailed description of one block S310 in FIG. 3 of one embodiment for preprocessing to a test electronic document.

In block S410, a color image of the test electronic document is generated using the scanner 6.

In block S411, the preprocessing module 210 removes cachets from the color image by means of color conversion. In one embodiment, the preprocessing module 210 converts the color of the cachets into a specific color (e.g., white) by means of the color conversion. It is noteworthy, that R, G, and B respectively represent a red component value, a green component value, and a blue component value of a pixel of the color image. For example, red can be represented by R=255, G=0, and B=0, and white can be represented by R=255, G=255, and B=255. Depending on this embodiment, the preprocessing 210 converts the red of R=255, G=0, and B=0 into the white of R=255, G=255, and B=255.

In block S412, the preprocessing module 210 converts the color image into a gray image. In one embodiment, the preprocessing module 210 converts the color image into the gray image by computing a gray value of each pixel of the color image using a converting formula. In one embodiment, the converting formula may be as follows: gray value=R*0.3+G*0.59+B*0.11.

In block S413, the preprocessing module 210 converts the gray image into a black-white image by comparing a gray value of each pixel of the gray image with a threshold value, such as 127, for example. A black-white image only includes two colors of black and white. The pixel value of "1" represents black and the pixel value of "0" represents white. In one embodiment, if a gray value of a pixel is more than or equal to the threshold value, the pixel value changes to "1." Otherwise, if the gray value of the pixel is less than the threshold value, the pixel value changes to "0."

In block S414, the preprocessing module 210 removes noise from the blank-white image. In one embodiment, the preprocessing module 210 converts the pixel value of the noise into the pixel value "1." For example, as shown in FIG. 5, the preprocessing module 210 converts the pixel value of the noise 502 and 503 into the pixel value "1."

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. An electronic document comparison system, comprising:
    a storage system;
    a database system that stores a standard electronic document;
    at least one processor; and
    an electronic document comparison unit stored in the storage system and being executable by the at least one processor, the electronic document comparison unit comprising:
    a preprocessing module operable to preprocess a test electronic document to remove cachets and noise from the test electronic document;
    an identifying module operable to identify the test electronic document using optical character recognition (OCR), and generate a plurality of second minimum blocks and obtain coordinates of each of the second minimum blocks;
    a comparison module operable to compare each of the second minimum blocks with a corresponding first minimum block in the standard electronic document line by line, and obtain the second minimum blocks having different coordinates on each line;
    a filtration module operable to simplify the obtained second minimum blocks having different coordinates by filtering designated objects; and
    a mark module operable to mark the simplified second minimum blocks in the test electronic document.

2. The system of claim 1, wherein the test electronic document is an electronic contract or an electronic order.

3. The system of claim 1, wherein the test electronic document is generated using a scanner.

4. The system of claim 1, wherein the coordinates of each second minimum block comprise a distance to left page margin of the test electronic document and a distance to top page margin of the test electronic document.

5. The system of claim 1, wherein the designated objects comprise fault-tolerant characters, punctuation, and similar characters, the filtration module filters the designated objects using a fault-tolerant method, punctuation mark filtration method, or a character filtration method.

6. The system of claim 1, wherein the mark module marks the simplified second minimum blocks by highlighting a specific color, or underlining.

7. The system of claim 1, wherein the mark module further outputs a report to show the position information of the simplified second minimum blocks.

8. An electronic document comparison method implemented by a computerized device, the method comprising:
    (a) preprocessing a test electronic document to remove cachets and noise from the test electronic document;
    (b) identifying the test electronic document using optical character recognition (OCR), and generating a plurality of second minimum blocks and obtaining coordinates of each of the second minimum blocks;
    (c) comparing each of the second minimum blocks with a corresponding first minimum block in the standard electronic document line by line, and obtaining the second minimum blocks having different coordinates on each line;
    (d) simplifying the obtained second minimum blocks having different coordinates by filtering designated objects; and
    (e) marking the simplified second minimum blocks in the test electronic document.

9. The method of claim 8, wherein the test electronic document is an electronic contract or an electronic order.

10. The method of claim 8, wherein the designated objects comprise fault-tolerant characters, punctuation, and similar characters, the filtration module filters the designated objects using a character filtration method, punctuation mark filtration method, or a fault-tolerant method.

11. The method of claim 8, wherein the simplified second minimum blocks are marked by highlighting a specific color, or underlining.

12. The method of claim 8, wherein the block of preprocessing a test electronic document comprises:
    generating a color image of the test electronic document using a scanner;
    removing cachets from the color image by means of color conversion;
    converting the color image into a gray image;

converting the gray image into a black-white image; and removing noise from the blank-white image.

13. The method of claim 12, wherein the block of removing the noise from the blank-white image comprises:
converting a pixel value of the noise into the pixel value "1."

14. A non-transitory computer-readable medium having stored thereon instructions that, when executed by a computing device, causing the computing device to perform an electronic document comparison method, the method comprising:
(a) preprocessing a test electronic document to remove cachets and noise from the test electronic document;
(b) identifying the test electronic document using an optical character recognition (OCR) software application, and generating a plurality of second minimum blocks and obtaining coordinates of each of the second minimum blocks;
(c) comparing each of the second minimum blocks with a corresponding first minimum block in the standard electronic document line by line, and obtaining the second minimum blocks having different coordinates on each line;
(d) simplifying the obtained second minimum blocks having different coordinates by filtering designated objects; and
(e) marking the simplified second minimum blocks in the test electronic document.

15. The non-transitory computer-readable medium of claim 14, wherein the test electronic document is an electronic contract or an electronic order.

16. The non-transitory computer-readable medium of claim 14, wherein the designated objects comprise fault-tolerant characters, punctuation, and similar characters, the filtration module filters the designated objects using a character filtration method, punctuation mark filtration method, or a fault-tolerant method.

17. The non-transitory computer-readable medium of claim 14, wherein the simplified second minimum blocks are marked by highlighting a specific color, or underlining.

18. The non-transitory computer-readable medium of claim 14, wherein the block of preprocessing the test electronic document comprises:
generating a color image of the test electronic document using a scanner;
removing cachets from the color image by means of color conversion;
converting the color image into a gray image;
converting the gray image into a black-white image; and
removing noise from the blank-white image.

19. The non-transitory computer-readable medium of claim 18, wherein the block of removing the noise from the blank-white image comprises:
converting a pixel value of noise into the pixel value "1."

* * * * *